United States Patent
Cao et al.

(10) Patent No.: US 11,897,314 B2
(45) Date of Patent: Feb. 13, 2024

(54) METHOD, COMPUTER PROGRAM AND SYSTEM FOR IMPROVING A USER EXPERIENCE

(71) Applicant: BAYERISCHE MOTOREN WERKE AKTIENGESELLSCHAFT, Munich (DE)

(72) Inventors: Yang Cao, Chicago, IL (US); Jilei Tian, Chicago, IL (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 285 days.

(21) Appl. No.: 17/153,007

(22) Filed: Jan. 20, 2021

(65) Prior Publication Data
US 2022/0227377 A1    Jul. 21, 2022

(51) Int. Cl.
*B60H 1/00*    (2006.01)

(52) U.S. Cl.
CPC ............... *B60H 1/00878* (2013.01); *B60H 2001/00733* (2019.05)

(58) Field of Classification Search
None
See application file for complete search history.

(56) References Cited

U.S. PATENT DOCUMENTS

| | | | | |
|---|---|---|---|---|
| 2018/0134118 A1* | 5/2018 | Hintea | ............... | B60H 1/00742 |
| 2020/0094651 A1* | 3/2020 | Ostrowski | ............. | G06N 20/00 |
| 2020/0352514 A1* | 11/2020 | Androulakis | ............ | F24F 11/65 |
| 2020/0376927 A1* | 12/2020 | Rajaie | ................ | B60H 1/00764 |
| 2021/0097350 A1* | 4/2021 | Theocharous | ........... | G06N 5/04 |
| 2021/0138871 A1* | 5/2021 | Yanagida | ............ | B60H 1/00771 |
| 2021/0248465 A1* | 8/2021 | Yu | ........................ | G06N 3/0454 |
| 2022/0090811 A1* | 3/2022 | Li | ........................ | G06V 20/597 |
| 2022/0198598 A1* | 6/2022 | Li | .......................... | G06N 7/005 |
| 2022/0205666 A1* | 6/2022 | Tan | ........................ | G06Q 50/06 |
| 2022/0219691 A1* | 7/2022 | Maleki | ................. | G06F 11/079 |

OTHER PUBLICATIONS

Mansourifard et al., "Online Learning for Personalized Room-Level Thermal Control: A Multi-Armed Bandit Framework", Dept. of Electrical Engineering, University of Southern California, 2013 (Year: 2013).*

Auer et al., "Finite-time Analysis of the Multiarmed Bandit Problem", University of Technology Graz, A-8010 Graz, Austria, Machine Learning, 47, 235-256, 2002 (Year: 2002).*

* cited by examiner

*Primary Examiner* — Amelia Vorce
(74) *Attorney, Agent, or Firm* — 2SPL Patent Attorneys PartG mbB; Yong Hwang

(57) ABSTRACT

Embodiments relate to a method, computer program and system for improving a user experience. The computer-implemented method for improving a user experience inside a vehicle comprises determining an environmental context inside the vehicle, wherein the environmental context is assigned a plurality of actions, which influences the environmental context. Further, the method comprises choosing at least one action of the plurality of actions for improving the user experience.

13 Claims, 2 Drawing Sheets

---

100

110 — determining an environmental context inside the vehicle, wherein the environmental context is assigned a plurality of actions, which influences the environmental context 120 — choosing at least one action of the plurality of actions for improving the user experience.

METHOD, COMPUTER PROGRAM AND SYSTEM FOR IMPROVING A USER EXPERIENCE

FIELD

Embodiments relate to a method, a computer program and a system for improving a user experience inside a vehicle.

BACKGROUND

One of major tasks for autonomous action by machine is to reduce an interaction of a user with a vehicle to control its state, e.g., climate control, temperature setting, heating or cooling, windows, lighting, etc. A vehicle may provide a lot of options allowing a user to control and/or change the state for, e.g., climate, temperature, heating or cooling, windows, sunroof, lighting, sound volume, music, to name just few. The setting may be primarily supported by hardware buttons, knobs, etc., for typical human-machine interaction, or by virtual buttons on a touchscreen or by spoken language user interfaces. Interaction with those options does, however, distract user attention when driving and thus may deteriorate a user experience. Therefore, there may be a need to provide a method for improving a user experience inside a vehicle, e.g., when driving the vehicle.

SUMMARY

It may have a high demand to learn user behavior, being able to smartly assist driver by machine learning, thus minimize the interaction between user and vehicle. A user commonly makes a sequence of decisions to adjust a control. Thus, a user needs to take a sequence of corresponding actions during the driving for achieving e.g., better diving condition, depending on a change of context. Therefore, there may be a need to provide a method for improving a user experience inside a vehicle (e.g., when driving the vehicle), e.g., by reducing an interaction of the user for controlling an environmental context inside the vehicle.

This may be especially achieved by introducing the proposed method. This method shows a novel reinforcement learning algorithm framework that is applied for improving a driving experience by learning user driving behavior, thus may minimize user-vehicle interaction and may make the driving safer and joyful.

An example may provide a computer-implemented method for improving a user experience inside a vehicle. The method comprises determining an environmental context inside the vehicle, wherein the environmental context is assigned a plurality of actions, which influences the environmental context. Further, the method comprises choosing at least one action of the plurality of actions for improving the user experience.

In an example at least one chosen action may be assigned a plurality of arms, wherein each arm of the plurality of arms has a different influence on the environmental context. Further, an arm may be chosen for improving the user experience.

An example may further comprise assuming an initial parameter from a distribution of parameters for each action of the plurality of actions and sampling a reward for each action of the plurality of actions, wherein the environmental context and the initial parameters are used as input parameter. Further, choosing an action of the plurality of actions may be done in dependence of the sampled rewards.

An example may further comprise assuming an initial parameter from a distribution of parameters for each arm of the plurality of arms and sampling a reward for each arm of the plurality of arms, wherein the environmental context and the initial parameters are used as input parameter. Further, choosing an arm of the plurality of arms may be done in dependence of the sampled rewards.

An example may further comprise observing a reaction of the user and adding the information about the determined action and the observed reaction to the input parameters for sampling the rewards.

An example may further comprise observing a reaction of the user and adding the information about the determined arm and the observed reaction to the input parameters for sampling the rewards.

In an example the reaction of the user may be to change the chosen action and the method may further comprise setting the reward for the chosen action to a minimum value.

In an example the reaction of the user may be to change the chosen arm and the method may further comprise setting the reward for the chosen arm to a minimum value.

In an example the reaction of the user may be no change of the chosen action and the method may further comprise setting the reward for the chosen action to a maximum value.

In an example the reaction of the user may be no change of the chosen arm and the method may further comprise setting the reward for the chosen arm to a maximum value.

In an example for sampling the reward for each action of the plurality of actions and/or for each arm of the plurality of arms a machine learning model may be used.

In an example for sampling the reward for each action of the plurality of actions and/or for each arm of the plurality of arms a Gaussian noise and/or a Gaussian distribution may be used.

In an example for sampling the reward for each action of the plurality of actions and/or for each arm of the plurality of arms a linear Bayesian regression may be used.

In an example adding the information about the observed reaction may change at least one parameter of a used Gaussian noise and/or Gaussian distribution and/or linear Bayesian regression.

An example may provide a computer program product comprising a computer readable storage medium having program instructions embodied therewith, the program instructions executable by a device to cause the device to determine an environmental context inside the vehicle, wherein the environmental context is assigned a plurality of actions, which influences the environmental context. Further, to choose at least one action of the plurality of actions for improving the user experience.

An example may provide a device comprising a memory and at least one processor operably coupled to the memory and configured to perform the proposed method. In an example the device is portable by the user.

An example may be a vehicle comprising a proposed device.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
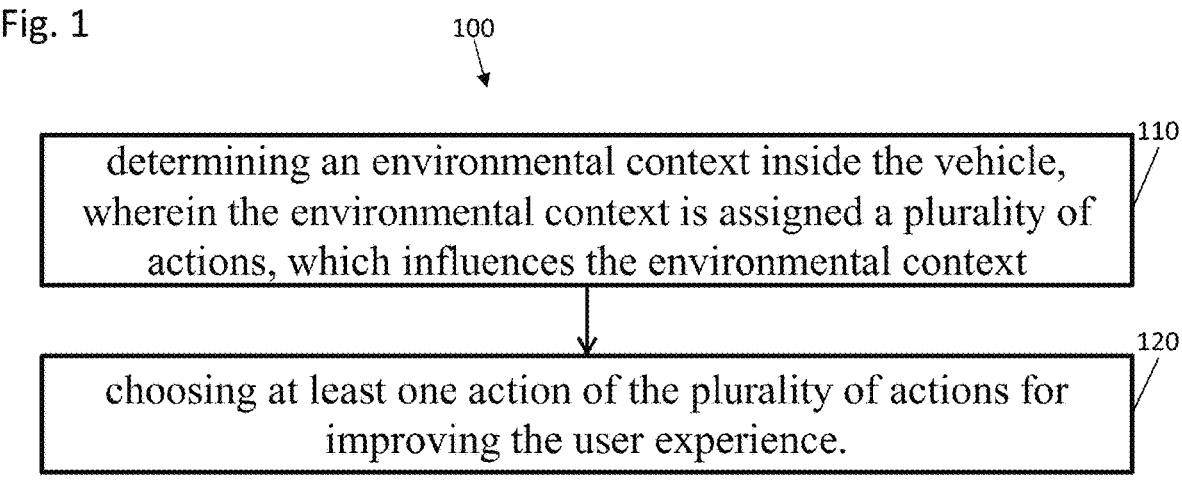
FIG. 1 shows a block diagram of a flow chart of an embodiment of a method for improving a user experience inside a vehicle.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 shows a block diagram of a flow chart of an embodiment of a method 100 for improving a user experience inside a vehicle, e.g., when driving the vehicle. The method comprises determining 110 an environmental context inside the vehicle, wherein the environmental context is assigned a plurality of actions, which influences the environmental context. Further, the method comprises choosing 120 at least one action of the plurality of actions for improving the user experience.

Determining 110 an environmental context may be performed by a sensor of the vehicle. For example, a sensor of the vehicle may determine a geolocation, a time, an environmental temperature inside the vehicle, a humidity inside the vehicle and so on. Alternatively and/or optionally, a sensor of a mobile electronic device of a user, e.g., a smartphone, may determine an environmental context and may transmit information about this environmental context to the vehicle.

For choosing 120 at least one action a predefined parameter may be used. For example, if a temperature inside the vehicle exceeds a threshold, e.g., 100° F., the action may be to turn on an air conditioning and/or to open a window. Thus, a temperature inside the vehicle may be reduced to pleasant temperature and a user experience may be improved without interaction by the user.

In an example of the method, the at least one chosen action is assigned a plurality of arms, wherein each arm of the plurality of arms has a different influence on the environmental context. Further the method comprises choosing an arm for improving the user experience. For example, if a temperature inside the vehicle exceeds a threshold, e.g., 80° F., the action may be to turn on an air conditioning on a middle level and/or to half open a window.

For example, a user may get in his vehicle after lunch at the restaurant in the summer. It may be very hot in the vehicle, e.g., 100° F., thus, normally the user may turn on the air conditioning, maximizes the climate and sets the temperature at the lowest (e.g., 60° F.), while the user may open the windows for a while. This action may be done by the computer-implemented method automatically without an interaction of the user. Thus, a user experience may be improved without interaction by the user. Further, a user may close the window after 5 min driving and may adjust the climate into a middle level, and may change the blowing direction, and also the temperature at 70° F. Thus, actions for changing the environmental context inside the vehicle may be stored in a database. So, a wide range of actions to improve a user experience may be performed without an interaction of the user by the computer-implemented method.

In an example, the method may further comprise assuming an initial parameter from a distribution of parameters for each action of the plurality of actions and sampling a reward for each action of the plurality of actions, wherein the environmental context and the initial parameters are used as input parameter. Further the method may comprise choosing an action of the plurality of actions done in dependence of the sampled rewards.

In an example, the method may further comprise assuming an initial arm parameter from a distribution of parameters for each arm of the plurality of arms and sampling an arm reward for each arm of the plurality of arms, wherein the environmental context and the initial arm parameters are used as input parameters. Further the method may comprise choosing an arm of the plurality of arms is done in dependence of the sampled arm rewards.

A (contextual) bandit model could be improved using e.g., Thompson sampling, that chooses an arm for the context in statistically efficient manner, simultaneously finding the best arm while attempting to incur low cost. The algorithm may work as follows:

Initialization: For each arm z a predefined parameter is assumed. The predefined parameter may be assumed by a prior distribution of parameters $\theta_{0,z}$.

First round for t=1, . . . , N

A context $c_t$ may be determined.

For each arm z a reward $r_{t,z}^*$ may be sampled from $p_z(c_t, \theta_{t-1,z})$, with $p_z$ a probability distribution.

A computation of a maximal reward $z_t^*$ may be done $$z_t^* = \max_z r_{t,z}^*.$$

An arm $a_t$ based on the maximal reward may be chosen $a = z_t^*$.

Thus, an arm may be chosen based on an initial distribution of rewards and a user experience may beneficially be increased. It goes without saying that the model described above for an arm is equally applicable for an action.

In an example, the method may comprises determining 110 an environmental context inside the vehicle, wherein the environmental context is assigned a plurality of actions based on learnt user behavior, which influences the environmental context. Further, the method may comprise choosing 120 at least one action of the plurality of actions for improving the user experience.

In an example, the method may further comprise assuming an initial parameter from a distribution of parameters for each action of the plurality of actions and sampling a reward for each action of the plurality of actions, wherein the environmental context and the initial parameters are used as input parameter. Further the method may comprise choosing an action of the plurality of actions done in dependence of the sampled rewards based on user's feedback. Hence, alternatively and/or optionally for choosing 120 an action based on learnt user behavior may be used.

The algorithm described above may further comprise at the first round:
Observing a reward $r_t$ given by a user for the action $a_t$.
Updating the computer-implemented method parameter $\theta_{t,z}$ with new data $(c_t, a_t, r_t)$.

In an example, the method may further comprise observing a reaction of the user and adding the information about the determined action and the observed reaction to the input parameters for sampling the rewards. In an example, the method may further comprise observing a reaction of the user and adding the information about the determined arm and the observed reaction to the input parameters for sampling the rewards. Thus, a parameter for the method may be updated during operation, which may lead to an improved user experience.

In an example, the reaction of the user is to change the chosen action and/or arm. The method may further comprise setting the reward for the chosen action and/or arm to a minimum value. In an example, the reaction of the user is no change the chosen action and/or arm. The method may further comprise setting the reward for the chosen action and/or arm to a maximum value. Thus, a parameter for the method may be advantageously adjusted based on a user preference.

The reaction of the user may be observed for a predefined time. For example, the reaction of the user may be observed for a predefined time, e.g., 1 min. If the user does not change the chosen action/arm in the predefined time, a reward may be set to a maximum value for this action/arm.

The reaction of the user may be observed for a time depending on a predefined change of the environmental context after choosing an action/arm. For example, the reaction of the user may be observed a time depending on a change of the temperature inside the vehicle, e.g., of 10° F. or for a change of temperature by at least 5%. If the user does not change the chosen action/arm in the time for the predefined change, a reward may be set to a maximum value for this action/arm. Thus, data for the computer-implemented method may be advantageously generate during operation.

In an example, for sampling the reward a machine learning model is used. Thus, a machine learning algorithm, e.g., a (contextual) bandit model, used for the method may be able to learn from the user behavior. Once a confidence is getting good, the method can help to manage those sequence of decisions and their corresponding actions, instead of the user.

A (contextual) bandit model may be a reinforcement learning framework that could be leveraged to address to improve a user experience inside a vehicle, e.g., when driving the vehicle. For this bandit model the input data may be a context stream $e_i$, a previous state stream $s_i$ and a user interaction event $a(c_i)$ as show in Tab. 1.

TABLE 1

Input parameter for the bandit model.

| | | | | | | | |
|---|---|---|---|---|---|---|---|
| context stream | $e_1$ | $e_2$ | ... | $e_{t-1}$ | $e_t$ | $e_{t+1}$ | ... $e_{...}$ |
| previous state stream | $s_0$ | $s_1$ | ... | $s_{t-2}$ | $s_{t-1}$ | $s_t$ | ... $s_{...}$ |
| user interaction event | | $a(c_2)$ | | | $a(c_t)$ | | |

A goal of the (contextual) bandit model may be to reduce a number of user's interaction. The (contextual) bandit model works as repeated interaction between user and artificial intelligence agent over T rounds.

At each round $t=1, 2, \ldots, T$ a (environmental) context stream and a previous state stream are as generally combined as extended context $c_t=(e_t, s_{t-1})$. The artificial intelligence agent may choose an arm $a_t$ from k possible arms according to the policy model $\pi: c_t \to a_t$, $a_t \in \{1, 2, \ldots, k\}$. The environment, e.g., an interaction of the user may give a reward $r_{t,a_t}$. A goal of the learning is to optimize the policy model to choose actions which will maximize the cumulative rewards:

$$\pi^* = \max_{\pi} \ R(\pi) = \sum_{t=1}^{T} r_{t,a_t} = \sum_{t=1}^{T} r_{t,\pi(c_t)}.$$

Arm $a_t$ means particular chosen setting state, for example, high wind, windows up, etc. Each unique setting state represents one arm. For example, suppose there may be three relevant control buttons for three corresponding actions. The first action may have two arms, open window and close window. The second action a control fan speed may have five arms. The third action a control for desired temperature may have three states, leading to a total arm number 2*5*3=30. Each arm may be a unique state of all relevant control for fully correlated context-interaction space. If some controls may have a continuous state, it could be converted to a discrete state using discretization procedure.

A reward may measure the user satisfaction to current chosen arm $r_{t,a_t}=1$ if the arm $a_t$ meets a user expectation for a current environmental context. In real life data, if there may be no user interaction event, it may mean the current action was correct and reward 1 may be given; if the user may have interacted and changed the settings, the reward 0 may be given.

Under (contextual) bandit model setting, reward $r_{t,a_t}$ may follow a probability distribution that depends on context and arm $r_{t,a_t} \sim p(r|c_t,a_t)=r_{z=a_t}(c_t, \theta_z)$, $r_z(c_t, \theta_z) \cdot r_{t,a_t}$ is the reward probability distribution function for an arm z given context $c_t$, $\theta_z\{z=1 \ldots k\}$ is the parameter of the function which will be estimated from learning procedure, k is the number of arms (e.g., states).

For example, a context of a simulation may be to adjust a temperature inside a vehicle. There may be 1 action assigned to an air conditioning system inside the car. There may be seven arms assigned to the air conditioning system. For example, these arms may be number 0, means turn off, number 1-3, means turn on heat to warm up the inside of the vehicle (e.g., 3 indicating arm with strongest influence and 1 indicating arm with weakest influence on the temperature inside the car), and number 4-6, means turn on air condition to cool down the inside of the vehicle (e.g., 6 indicating arm with strongest influence and 4 indicating arm with weakest influence on the temperature inside the car).

Date generation may be session-based. Thus, with session-based data generation a real situation may be simulated, e.g., a gradually cool down of the inside of the vehicle. For a beginning, a random generated threshold may be defined. The random generated thresholds may assume a user choice corresponding to the temperature inside the vehicle. For example, for a temperature t inside the vehicle of t>86° F. the chosen arm may be number 6, so a cool down by the air condition may be set a maximum level. Between 77° F. and 86° F., 77° F. <t<86° F. the chosen arm may be number 5, so a cool down by the air condition may be set to a medium level. These thresholds may be given by the predefined parameter as described above.

Further, for the simulation a gradually adjustment of a user may be assumed. For example, a user may adjust a temperature inside the vehicle gradually, e.g., by turning on a maximum level and changing this maximum level to a medium level later on. While a number of sessions may be smaller than a target (the target may be a number of minimal runs of the simulation for a user to generate parameter, which can replace the predetermined parameter) the simulation may be performed as follows:

Generate an initial temperature $t_0$ inside the vehicle, get a right arm $a_0$ from thresholds, leading to a context $(t_0, 0)$ and sample a reward for arm z according to $r_{0,z}=0$ if $z \neq a_0$ else $r_{0,a_0}=1$.

While the session may be not finished:

Generate current temperature $t_i$ inside the vehicle $t_i = t_{i-1} - $random, (e.g., random indicates a random temperature, for example based on a predetermined parameter; – is used for cool down, for heating up the–may be changed to a +), get a right arm $a_i$, and sample a reward for arm z according to $r_{i,z}=0$ if $z \neq a_i$ else $r_{i,a_i}=1$.

If $t_i$ reaches a predefined value and/or range the session may be stopped.

Session-based generated data may be used in a probability model. A reward probability distribution function for each arm z could be modelled with different machine learning models, e.g., linear models and/or neural networks. A reward for an arm $z_i$ may be assumed to be generated according to:

$$z_i(c_t) = \beta_i^T v_t + \varepsilon_i = \beta_i^T nn(c_t + \varepsilon_i, \quad i=1, \ldots, k, \quad (1)$$

with k the number of arms, nn a neural network, which transforms input context and previous state into a representation $v_t$ and $\varepsilon_i$ is Gaussian noise with $\varepsilon_i \sim \mathbb{N}(\mu_i, \Sigma_i \sigma_i^2)$. Here, $\sigma_i$ follows from the Bayesian linear regression and is modelled as inverse gamma distribution with parameters $a_i$ and $b_i$. $\beta_i$ is modelled as Gaussian distribution: $\beta_i \sim \mathbb{N}(\mu_i, \Sigma_i \sigma_i^2)$.

A purpose of a neural network may be to find a good representation for a context and previous state, so a reward distribution could be modelled as linear Bayesian regression on the representation. In equation (1), for context $c_t$, a reward distribution functions of different arms may be based on common representation $v_t$ and an output of the neural network can be shared with all arms. For the simulation two layers fully connected to the neural networks may be used, taking the input from context and previous state, the node size of output layer is 50, with an activation function, e.g., Rectified Linear Units. The parameters to be updated may be $a_i$, $b_i$, $E_i$ with $i=1, \ldots, k$ weights and bias of the neural network.

It goes without saying that the model described above for arms is equally applicable for actions. For example, the simulation described above may be used for actions instead of arms.

More details and aspects are mentioned in connection with the embodiments described below. The example shown in FIG. 1 may comprise one or more optional additional features corresponding to one or more aspects mentioned in connection with the proposed concept or one or more examples described below (e.g., FIG. 2-4).

Figure 2:
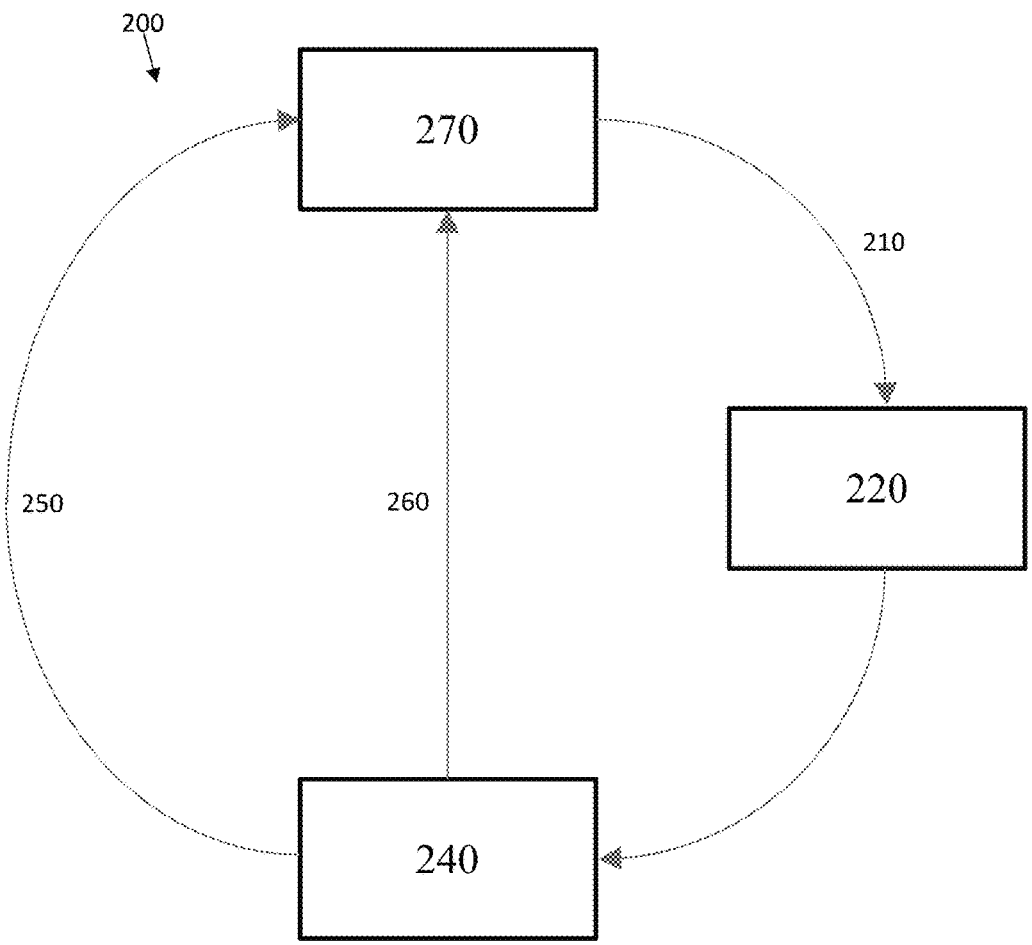
FIG. 2 shows a block diagram of a reinforcement learning method.

FIG. 2 shows a block diagram of a reinforcement learning method. The method 200 may comprise choosing 210 an action/arm to influence an environmental context of an inside of a vehicle. The action/arm may be chosen by an artificial intelligence agent. The action/arm may be chosen based on information about an environmental context inside the vehicle and/or predefined parameters and/or parameter obtained by the computer-implemented method as described above. Information about the environmental context may be determined as described above.

The method 200 may further comprise adjusting 220 a setting of an environmental controlling circuitry with impact on the environmental context inside the vehicle to change the environmental context. Thus, the environmental context inside the vehicle may be changed by the chosen action/arm.

The method 200 may further comprise observing 240 the environmental context inside the vehicle. For example, a change of a temperature may be observed for a predefined time after adjusting 220 a setting and/or for a predefined total change of the temperature, e.g., for a cool down from 100° F. to 87° F. Thus, a time period in which the user may react to the chosen action/arm may be defined. Herewith, an observation of the user reaction may be improved, e.g., by defining short time periods, e.g., a cool down of 1° F.

The method 200 may further comprise transmitting 250 an information about an observation to a controlling circuity. For example, if the user does not react in a given time period the information may be that the user may be satisfied with the chosen action/arm. For example, the information in this case may be, that a reward for the chosen action/arm may be set to 1, indicating that the chosen action/arm was correct.

Alternatively, to the step transmitting 250 the method 200 may further comprise transmitting 260 a reward from a user feedback. For example, if the user does react in a given time period the information may be that the user may be satisfied with the chosen action/arm. For example, the information in this case may be, that a reward for the chosen action/arm may be set to 0, indicating that the chosen action/arm was wrong.

The method 200 may further comprise adjusting 270 data for choosing an action/arm. For example, a parameter for a reward of an action/arm for a given environmental context may be replaced by the reward obtained by transmitting 250 or transmitting 260. Thus, data for the computer-implemented method may be advantageously update.

After adjusting 270 data all steps of the method 200 may be repeated any desired time. For example, the method 200 may be repeated until a predefined environmental context is achieved. By repeating the method 200 the artificial intelligence agent may improve a performance, because the data may be improved. For example, the user may not always be in favor of the action the artificial intelligence agent may have learnt and executed. Thus, the user can freely update it at his wish, e.g., by changing an action/arm in a given time period. This allows the artificial intelligence agent a better learning of the user's behavior from those occasional update as a feedback and may reduce the interaction from the user as a learning objective. This use case may illustrate how the algorithm, e.g., the artificial intelligence agent, is able to help the user. Since the algorithm itself may be more generic and may learn user behavior based on the data that may lead to the use cases and features. For example, the algorithm can be extended to other features too.

The artificial intelligence algorithm, e.g., a bandit model, may efficiently learn user behavior with very few data. However traditional contextual bandit model did not utilize previous state information and cannot perform state-dependent sequential decision. By adding previous state into extended context, the next action may also depend on last action, the whole decision procedure may become a sequential process.

More details and aspects are mentioned in connection with the embodiments described above and/or below. The example shown in FIG. 2 may comprise one or more optional additional features corresponding to one or more aspects mentioned in connection with the proposed concept or one or more examples described above (e.g., FIG. 1) and/or below (e.g., FIG. 3-4).

Figure 3:
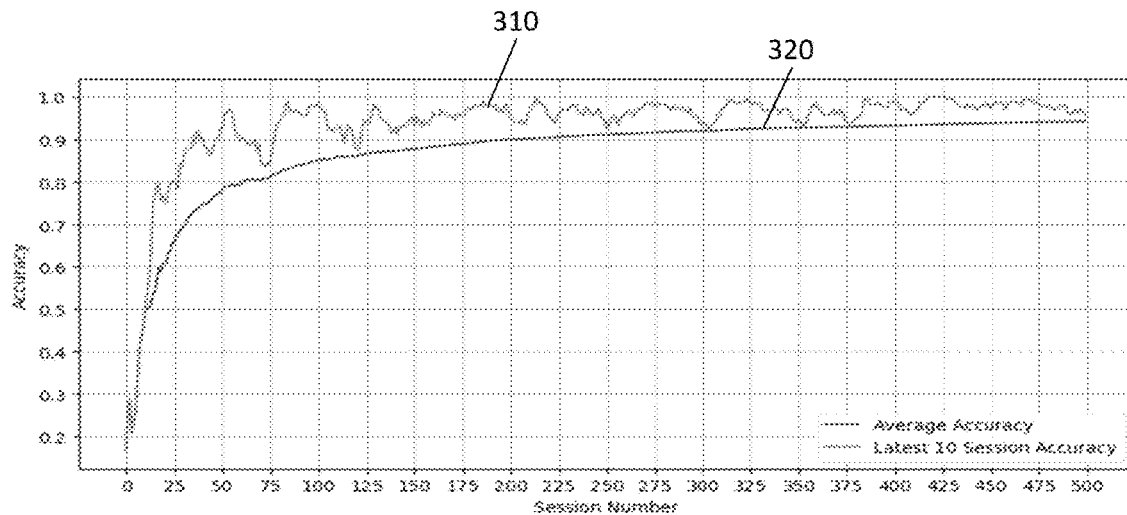
FIG. 3 shows a simulation of an accuracy of a chosen action/arm.

FIG. 3 shows a simulation of an accuracy of a chosen action/arm. The simulation in FIG. 3 may be understood as proof-of-principle. The simulation shows an obtained accuracy over a number of runed sessions. The graph 310 shows the accuracy averaged over the latest ten sessions, whereas the graph 320 shows the accuracy averaged over all sessions. As can be seen in both graphs 310, 320 the accuracy increases with the session number. Here, the accuracy may be calculated by:

$$accuracy = \frac{number(correct\ action)}{number(action)}.$$

Thus, the computer-implemented method may increase a performance during operation.

Data for the simulation may be generated as described above. For each session, the following steps may be performed for each round:

Run the algorithm (e.g., the contextual bandit model) as described above to select a current action/arm based on current parameters (e.g., predefined parameters or parameters obtained by a former session)

The system (e.g., a user) returns a feedback, for example if a user performs a correction action a return may be 1, else it may be 0. An evaluation of a performance may be based on the feedback, leading to the accuracy as described above.

Update the parameters based on the feedback of a user. For example, if a user performs a correction a reward sampled to a chosen action/arm may be set to 0, else to 1.

Graph 310 and graph 320 show two different performance metrics used to represent the accuracy of the computer-implemented method, namely average accuracy from latest 10 sessions and from all sessions, respectively. An accuracy based on one session may be unstable, since some sessions may only contain very few samples, e.g., just one sample. Thus, provided data from this session may not be sufficient enough to increase a performance of the computer-implemented method.

Therefore, the average accuracy from all session may be applied (graph 320) to illustrates a user experience gain. At a beginning (number of sessions may be 0) the accuracy may be very low, e.g., below 20%. This accuracy may be provided by information without any relation to an actual user, e.g., by predefined parameters. For example, this accuracy may be achieved by assuming an action/arm based on data without any achieved reward of a user. With increasing number of sessions, a number of rewards provided by the user may increase. Thus, the computer-implemented algorithm may increase a performance, based on the rewards provided by the user. So, the accuracy from all session may increase with the session number and may reach an accuracy of 94.7% after 500 sessions. For example, after 500 sessions nearly 95 out of 100 chosen actions/arms may satisfy the user, leading to non reaction of the user in these cases, e.g., the user does not change the chosen action/arm. For example, only for 5 out of 100 chosen actions/arms the user may change a chosen action/arm. Thus, the user experience may be improved by the computer-implemented method.

The accuracy from all sessions may be strongly influenced by the low accuracy of the first session, especially for lower session numbers. (e.g., session number 0-10). Thus, the accuracy from all sessions may give an incorrect representation of an accuracy achieved at lower session numbers. Therefore, the average accuracy from the latest 10 sessions may be applied. This may lead to an improved illustration of the achieved accuracy, which may affect the user experience. In comparison to the average accuracy from all sessions, the accuracy from latest 10 sessions may reach an accuracy of 75% for session number 15 and may reach an accuracy of 90% for session number 35. Thus, the proposed computer-implemented method may learn a user behavior efficiently and may improve a user experience.

More details and aspects are mentioned in connection with the embodiments described above and/or below. The example shown in FIG. 3 may comprise one or more optional additional features corresponding to one or more aspects mentioned in connection with the proposed concept or one or more examples described above (e.g., FIG. 1-2) and/or below (e.g., FIG. 4).

Figure 4:
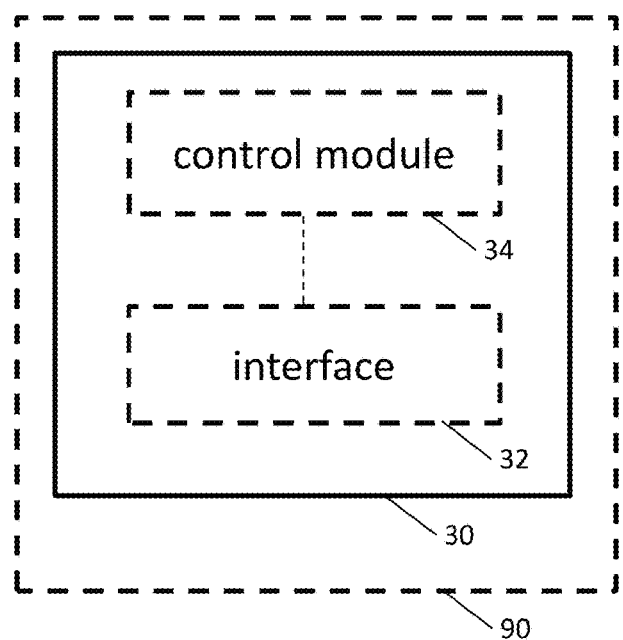
FIG. 4 shows a block diagram of an embodiment of a device.

FIG. 4 shows a block diagram of an embodiment of a device. The device 30 comprises processing circuitry, which is configured to perform the method described herein. For example, the device 30 may comprise one or more interfaces 32, which are coupled to a control module 34. The device 30 may be used in a vehicle 90. The control module 34 controls the one or more interfaces 32 and is configured to perform any of the methods described herein. Another embodiment is a machine-readable medium including code, when executed, to cause a machine to perform the method for training a machine learning module for determining a route connecting a plurality of destinations in a road network.

In embodiments the one or more interfaces 32 may correspond to any means for obtaining, receiving, transmitting or providing analog or digital signals or information, e.g., any connector, contact, pin, register, input port, output port, conductor, lane, etc. which allows providing or obtaining a signal or information. An interface 32 may be configured to communicate, i.e., transmit or receive signals, information with further internal or external components. The one or more interfaces 32 may comprise further components to enable according communication in a (mobile) communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly, adapted radio frequency components, etc. In some examples the one or more interfaces 32 may serve the purpose of transmitting or receiving or both, transmitting and receiving, information, such as information, input data, control information, further information messages, etc.

As shown in FIG. 4 the respective one or more interfaces 32 are coupled to the respective control module 34 at the apparatus 30. In embodiments the control module 34 may be implemented using one or more processing units, one or more processing devices, any means for processing, such as a processor, a computer or a programmable hardware component being operable with accordingly adapted software. Similar, the described functions of the control module 34 may as well be implemented in software, which is then executed on one or more programmable hardware components. Such hardware components may comprise a general-purpose processor, a Digital Signal Processor (DSP), a micro-controller, etc.

In an embodiment the device 30 may comprise a memory and at least one processor 34 operably coupled to the memory and configured to perform the above-mentioned method.

More details and aspects are mentioned in connection with the embodiments described above. The example shown in FIG. 4 may comprise one or more optional additional features corresponding to one or more aspects mentioned in connection with the pro-posed concept or one or more examples described above (e.g., FIG. 1-3).

The computer-implemented method proposed above may provide a reinforcement learning based algorithm to autonomously learn user behavior under different context. The method may do not need supervised annotation data and can efficiently and automatically learn on a small set of data adaptively. It may be getting more useful when dealing with a sequence of decisions and actions that may be a common usage scenario but distracting user's attention.

The algorithm framework may be flexible. The algorithm framework may be general, so it can naturally be extended to more use cases and features, all depending on the data, e.g., interior control by machine while driving on the road.

The method may improve a driving safety. The method may be targeted to minimize the user-machine interaction as the learning objective, thus, to minimize the user distraction during the driving, while dynamically keeping driving environment convenient along the change of context.

The method may improve a user experience toward autonomous control the state of vehicle. The method may effectively learn user behavior against change of context, that is more common in the real-life situation, particularly in the vehicle driving.

The method may enable personal and contextual driving experience and may provide effortless personal and contextual driving experience.

Several reinforcement learning models (e.g., policy gradient) could leverage the state and context for decision optimization, however those models need huge amount of training data which may be not suitable for the real-life scenario.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

If some aspects have been described in relation to a device or system, these aspects should also be understood as a description of the corresponding method and vice versa. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A computer-implemented method for optimizing a user experience inside a vehicle, comprising:
   receiving, by a receiver, a signal carrying information regarding an environmental context inside the vehicle from a sensor via a wireless or wired channel, wherein the sensor is either a device installed in the vehicle or a device included in a mobile electronic device of a user, wherein the environmental context is assigned a plurality of actions, which influences the environmental context;

sampling, by a machine learning model, a reward for each action of the plurality of actions based on the environmental context and parameters for the machine learning model for sampling rewards for the plurality of actions;

choosing, by the machine learning model, at least one action of the plurality of actions for optimizing the user experience based on the sampled rewards;

controlling a vehicle system in the vehicle to implement the at least one chosen action to change the environmental context inside the vehicle;

observing a reaction of the user in response to controlling the vehicle system to change the environmental context inside the vehicle; and updating the parameters for the machine learning model for sampling the rewards based on the reaction.

2. The method according to claim 1, wherein the at least one chosen action is assigned a plurality of arms, wherein each arm of the plurality of arms has a different influence on the environmental context; and further comprising:

choosing an arm for optimizing the user experience; and controlling the vehicle system in the vehicle to implement the chosen arm to change the environmental context inside the vehicle.

3. The method according to claim 2, further comprising:

assuming an initial arm parameter from a distribution of parameters for each arm of the plurality of arms;

sampling an arm reward for each arm of the plurality of arms, wherein the environmental context and the initial arm parameters are used as input parameters for sampling the arm reward; and wherein choosing an arm of the plurality of arms is done in dependence of the sampled arm rewards.

4. The method according to claim 3, further comprising:

adding information about the determined arm and the observed reaction to the input parameters for sampling the rewards.

5. The method according to claim 4, wherein the reaction of the user is to change the chosen action and/or arm; and further comprising setting the reward for the chosen action and/or arm to a minimum value.

6. The method according to claim 4, wherein the reaction of the user is no change of the chosen action and/or arm; and further comprising setting the reward for the chosen action and/or arm to a maximum value.

7. The method according to claim 1, wherein for sampling the reward a Gaussian noise and/or a Gaussian distribution is used.

8. The method according to claim 1, wherein for sampling the reward a linear Bayesian regression is used.

9. The method according to claim 1, wherein adding the information about the observed reaction changes at least one parameter of a used Gaussian noise and/or Gaussian distribution and/or linear Bayesian regression.

10. A computer program product comprising a non-transitory, computer-readable storage medium having program instructions embodied therewith, the program instructions executable by a device to cause the device to perform the method of claim 1.

11. A device comprising:

a memory; and at least one processor operably coupled to the memory; and wherein the device is configured to perform the method of claim 1.

12. The device according to claim 11, wherein the device is portable by the user.

13. A vehicle comprising the device of claim 11.

* * * * *